Nov. 19, 1968  C. BARFIELD  3,411,739
FISHPOLE TIP-UP
Filed Feb. 16, 1966
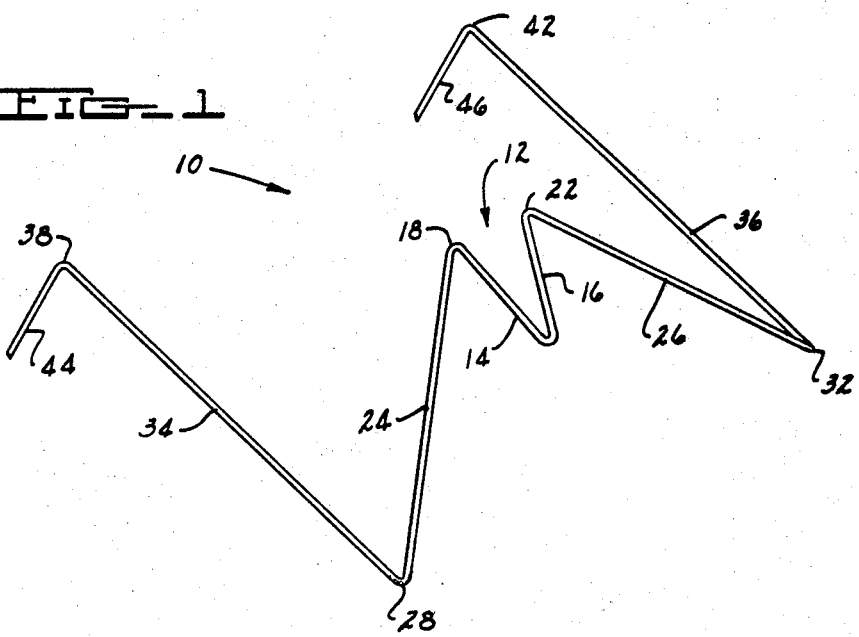
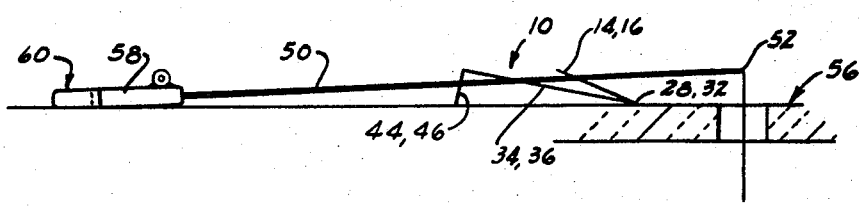
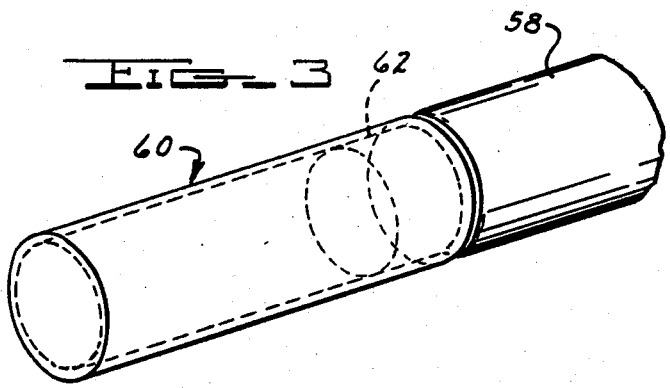
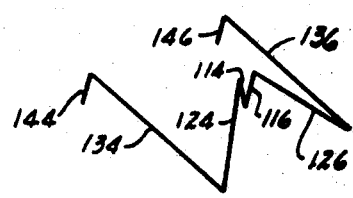
INVENTOR
CARLOS BARFIELD
BY
ROBERT H. ELLIOTT 3,411,739
FISHPOLE TIP-UP
Carlos Barfield, 19961 Winthrop,
Detroit, Mich. 48219
Filed Feb. 16, 1966, Ser. No. 527,882
6 Claims. (Cl. 248—38)

ABSTRACT OF THE DISCLOSURE

A fishpole tip-up for supporting a pole in an inclined position is formed as a unitary member having a symmetrical configuration. The central portion of the member has a V-shaped notch for supporting the pole and a pair of legs extending downwardly from the notch to contact a supporting surface. Two other legs are formed as extensions of the first pair of legs extending rearwardly and angularly upwardly and then downwardly to also contact the supporting surface and provide a four-point surface contact with the first pair of legs.

---

The present invention relates to new and useful improvements in fishing gear and more particularly to a new and unique fishpole tip-up.

In today's modern automated world and booming economy, yesterday's slave is a man of comparative leisure by present standards, the fruits of his labor having been rewarded through systematic increases in wages, longer vacations and early retirement. Thus, a man of leisure now has time to engage in his favorite pastime, whatever it may be. If it be sports in the form of fishing, the present invention is directed to him.

While fishing in and of itself is not new, certain aspects of the equipment used could use a little modification and improvement.

It is therefore a primary object of the present invention to provide a fishpole tip-up which is simple, durable and relatively inexpensive.

Another object of the invention is the provision of a fishpole tip-up which will engage the pole and prevent it from being pulled into the water when a fish takes the bait.

Still another object of the present invention is the provision of a fishpole which has a bait container secured to the hand grip for quick and easy access.

Another object of the invention is the provision of a fishpole tip-up which can be used on a bank as well as on ice in the winter.

The above and other objects of the present invention can be accomplished by the provision of a four point surface contact fishpole tip-up having two upwardly depending legs in the form of a V, each of said legs thereafter being deformed to form an M shape, said M-shaped legs being deformed rearwardly in generally parallel relationship to each other to form two surface contact points, while the two outer ends thereof are deformed downwardly to contact two points on the surface on which the tip-up is positioned, the two ends of said downturned portion being sharp while at the intersection of the M-shaped legs with the parallel portion of the legs, a knurl or friction material is provided for surface contact while a friction member is positioned around said V-shaped legs for engagement with the fishpole positioned therebetween, with the said fishpole having a bait container secured on the hand grip portion thereof.

Other objects of the invention will appear in the following description and appended claims, reference being had to the accompanying drawings, forming a part of this specification wherein like reference characters designate corresponding parts in the several views.

In the drawings:

FIGURE 1 illustrates a fishpole tip-up which embodies the present invention and is shown in perspective.

FIGURE 2 shows a fishpole tip-up during usage with a fishpole having a bait container on the handle grip portion theerof.

FIGURE 3 illustrates an enlarged view of the handle grip portion and the bait container secured thereon.

FIGURE 4 is a modified form of the present invention wherein the V-shaped pole support portion is disposed in substantially vertical relationship to the surface on which the tip-up is positioned.

Looking now at the drawings, it will be noted in FIGURE 1 that the tip-up structure 10 is of unitary construction and of generally symmetrical configuration. The central portion of the body 12 has two upwardly depending legs 14 and 16 in the form of a V. The legs 14 and 16 are of substantially the same length and are deformed a second time to define leg portions 24 and 26, with radial portions 18 and 22 at the intersection of said legs 14 and 16. The leg portions 24 and 26 are of substantially the same length and depend downwardly and outwardly from said V shape to form an M shape. The legs 24 and 26 are then deformed rearwardly in generally parallel relationship to form legs 34 and 36, with radial portions 28 and 32 at the intersection of the respective legs forming two surface contact points. Legs 34 and 36 are of substantially the same length, with the end portions 44 and 46 thereof being deformed downwardly at substantially right angles to the legs 34 and 36 and in generally parallel relationship to each other so as to form two more surface contact points. Radial portions 38 and 42 are intermediate the respective leg portions.

Legs 14, 16, 24 and 26 are located in a first single plane, while legs 34 and 36 are in a second plane which intersects the first plane in angular relationship, while legs 44 and 46 are in a third plane which intersects the second plane at substantially right angles. The included angle of intersection between the first plane and the second plane is less than 90°.

While the proportional length of each of the legs 14 and 16 is illustrated as being approximately one-third the length of legs 24 and 26 with the length of legs 24 and 26, being two-thirds the length of legs 34 and 36 while legs 44 and 46 are approximately one-quarter the length of legs 34 and 36, it will be noted these dimensions are not critical to the practice of the invention, but are merely used for purposes of illustration.

FIGURE 2 of the drawings shows the tip-up 10 of the present invention and the fishpole 50 with a bait container 60 positioned on the handle grip member 58. In operation, the fishpole 50 is being used for ice fishing in the present instance and is positioned centrally between the legs 14 and 16, with the rod being in generally parallel relationship to the legs 34 and 36 when viewed from the top. Since the tip-up is made from a resilient material, the rod is frictionally engaged between the legs. The fishline is run along the pole and off the end 52 thereof and into an opening cut in the ice 56. Thus, when a fish takes the bait on the end of the line, the radial portions 28 and 32 intermediate legs 24 and 34 and 26 and 36 respectively will be drawn into firm engagement with the ice 56, as well as the downturned ends of legs 44 and 46. As the reel unwinds, the fisherman's attention will be drawn to the rod, at which time he can retrieve his catch.

Since the opening in the ice is relatively small and the legs 34 and 36 are disposed apart a greater distance than the dimension of the opening in the ice and the rod is frictionally engaged by portions 14 and 16 of said tip-up, the possibility of loss of a rod and reel is almost nonexistent.

To further improve the present invention, the legs 14 and 16 are covered with a soft frictional tubing or the like to better grip the rod. In addition, a knurl can be placed on the radial portions 28 and 32 for better engagement with ice or other surface, or a spur (not shown) can be welded to each of the legs 34 and 36, the free end thereof being adapted for engagement with the surface on which the tip-up is positioned.

In FIGURE 3 of the drawings, a generally transparent bait container 60 is secured to the handle grip member 58 for easy access. Thus, when a fisherman needs a fly, a hook, a leader or the like, it is readily available without going to the tackle box. In the present instance, the end of the handle grip member 58 is undercut to form a cylindrical section 62 thereon. The cylindrical section 62 is of the same relative dimension as the transparent bait container 60 which is pressed thereover. This provides a simple, quick and inexpensive means for having readily accessible bait at all times.

With reference to FIGURE 4 which is a modified form of the present invention, it will be noted that the tip-up is of substantially the same configuration as that shown in FIGURE 1, with one exception. The V-shaped portion of the tip-up depends in a fourth plane which is generally parallel to the third plane. This construction moves the center of gravity toward the rearmost legs 144 and 146.

The legs 114 and 116 define a generally V-shape, with legs 124 and 126 depending angularly forward and downward therefrom. Legs 134 and 136 depend angularly rearward from legs 124 and 126 in generally parallel relationship, while legs 144 and 146 depend downwardly therefrom at substantially right angles. As in the first instance, frictional material can be added to the V-shaped portion as well as at the intersection of legs 124 and 126 with legs 134 and 136 to provide more effective engagement with the surface on which the tip-up is being used.

From the foregoing description, it is apparent that the present fishpole tip-up is simple, durable and relatively inexpensive. It can be manufactured in quantity by modern mass production methods and it serves a need for the sportsman which has been long existent.

Having thus described my invention, I claim:

1. In a resilient four point surface contact fishpole tip-up, the combination of,
   a unitary structure having a central body fishpole support portion of substantially V shape, the leg sections of said V-shaped support portion being of generally the same length;
   said leg sections thereafter being deformed downwardly and outwardly to form an M-shape;
   said leg sections then formed rearwardly and in angular relationship to said M-shaped legs, which portions are of substantially the same length;
   thereafter the ends of said rearwardly depending leg portions are deformed downwardly, with said downwardly depending legs being of substantially the same length.

2. A device as in claim 1, wherein said rearwardly depending leg portions are in generally parallel relationship and perpendicular to the portions from which they depend.

3. A device as in claim 2, wherein the legs which form the V-shape and the leg sections that form the M-shape are in the same first plane, while the parallel leg portions are in a second plane, the included angles at the intersection of said planes being less than 90°, while the downwardly depending legs are in a third plane which is generally perpendicular to the second plane, with the ends of said legs forming two surface contact points, while the other two surface contact points are at the intersection of the first and second planes.

4. A device as in claim 1, wherein said V-shaped legs are in one plane, said leg sections which form the M-shape being in a second plane, the included angle of intersection being less than 90°, the rearwardly depending leg portions being in a third plane, the intersecting angle of said second and third planes being less than 90°, while said downwardly depending legs are in a fourth plane which is in generally parallel relationship to said first mentioned plane.

5. A device as in claim 1, wherein said V-shaped legs are covered with a friction material and the intersection of said rearwardly depending legs in the second plane and said M legs in the first plane have a knurl thereon for double contact with the surface on which the tip-up is positioned, with the two other surface contacts formed by the ends of the legs, while the V-shaped portion is for engagement with a fishpole.

6. In a unitary resilient fishpole tip-up for use with a conventional rod and reel, the combination of,
   a pair of legs of substantially the same length and formed in the shape of a V for the support of a rod and reel;
   the ends of said V-shaped leg sections deformed downwardly and outwardly in the form of an M, with all of said leg sections being in the same first plane;
   the ends of said M-shaped leg sections are deformed rearwardly and in a second plane, the inner edges thereof are in generally parallel relationship;
   the first plane and second plane intersecting at an angle less than 90°;
   the ends of said parallel leg portions depend perpendicularly and in parallel relationship to each other and in a plane which intersects said first plane at an angle less than 90°.

References Cited

UNITED STATES PATENTS

| | | | |
|---|---|---|---|
| 1,771,754 | 7/1930 | Hauenstein | 248—175 |
| 1,876,478 | 9/1932 | Van Duzer | 248—38 |
| 1,906,380 | 5/1933 | Johnson | 248—80 |
| 2,293,305 | 8/1942 | Oldham | 248—38 |
| 2,526,293 | 10/1950 | Stark | 43—23 |
| 2,574,442 | 11/1951 | Turner | 248—175 X |

SAMUEL KOREN, *Primary Examiner.*

D. J. LEACH, *Assistant Examiner.*